June 17, 1930. W. O. CARLEY 1,764,287
TWINE CUTTER
Filed April 20, 1927

INVENTOR
William O. Carley
BY
ATTORNEY

Patented June 17, 1930

1,764,287

UNITED STATES PATENT OFFICE

WILLIAM O. CARLEY, OF WALLA WALLA, WASHINGTON

TWINE CUTTER

Application filed April 20, 1927. Serial No. 185,134.

This invention relates to twine cutters and has as one of its objects to provide a cutter adaptable to counter or other uses, in tying up bundles or the like, or severing twine or light rope in the piece.

Another object of the invention is to provide a twine cutter that is portable, rendering it universal in its application in cutting large or small twine, or twine in large or small bundles.

A further object of the invention is to provide a twine cutter that may rest on a counter or other place, or that may be used by hand.

A further object of the invention is to provide a twine cutter having all sharp edges protected.

A further object of the invention is to provide a twine cutter having a cutting blade that is readily removable for sharpening purposes.

A further object of the invention is to provide a twine cutter that is relatively simple to construct and cheap to manufacture, and that is highly efficient in operation.

With these and other objects in view reference is now had to the accompanying drawings in which, Fig. 1 is a side elevation of the cutter proper;

Figure 1:
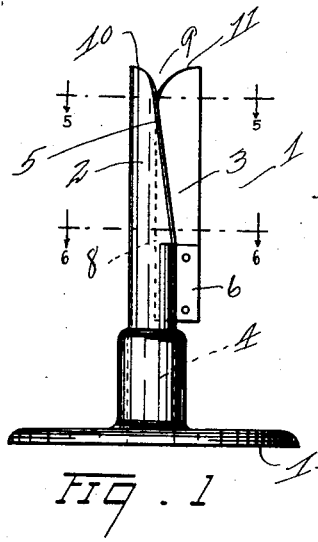

Having reference to the drawings like numerals refer to like parts throughout the several views, and the numeral 1 refers to the head of the cutting means which comprises a guard 2, a cutting blade 3 and a sleeve 4.

The head 1 is preferably of tubular construction with the upper, or guard part 2 formed to a generally U shape in cross section, the portion of the guard represented by the legs of the U being disposed to provide friction edges 5 formed thereon, and the lower part terminating in the above mentioned sleeve 4.

The friction edges are so called as they are shaped to provide a surface that will frictionally resist movement of the twine across the edges thereof, thereby assisting in overcoming the natural tendency of the cutting blade to merely draw the twine into the guard without severing it, and thus assist in the severing action.

To accomplish this result the edges are formed on the inside of each leg of the U by bevelling the outside, whereby a relatively blunt edge is produced that through its shape, and its position with relation to the twine as it meanders over these edges and the edge of the cutting blade preparatory to cutting, will offer a high resistance to movement across its edge, but, by having a blunter edge than that of the cutting blade, will permit sliding the twine along the friction edges without appreciable cutting while the same movement over the cutting edge will sever the twine, and further, by thus shaping and positioning these edges injurious contact therewith by the hand of the operator will be prevented.

The friction edges 5 are positioned in a generally parallel relation to the axis of the head and may have a slight inclination, for a purpose to be explained, if deemed advisable. Intermediately positioned wings 6, preferably formed integral with the head, are bent outward to receive and accommodate the cutting blade 3 removably attached thereto by screws 7.

The cutting blade is provided with a cutting edge 8 and is arranged with respect to the guard that, when installed between the wings, the cutting edge is extended into and is covered by the guard 2, as a further protective measure, with the cutting edge placed centrally between the friction edges and in angular relation therewith.

Figure 4:
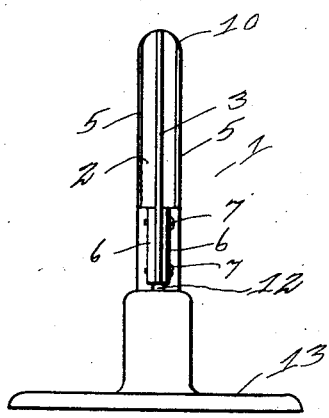
Fig. 4 is a side elevation of a modified form of cutter, provided with an extension.
Figure 4:
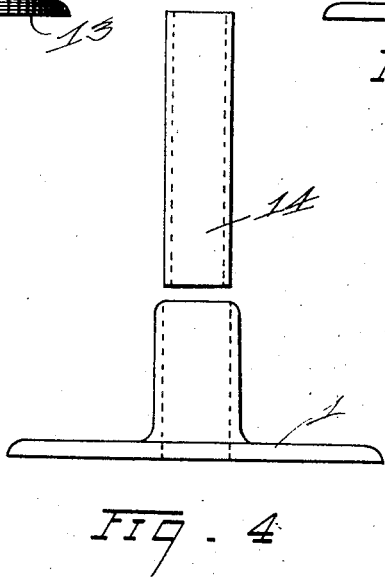
Figure 3:
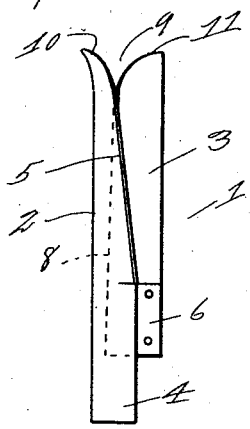
Fig. 3 is a side elevation of a modified form of cutter.
Figure 5:
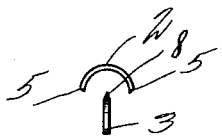
Fig. 5 is a section on the line 5—5 of Fig. 1.
Figure 6:
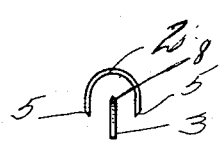
Fig. 6 is a section on the line 6—6 of Fig. 1.

The angular relation of the parts may be provided by inclining the cutting edge of the blade as shown by the dotted line in Fig. 4, and maintaining the friction edges of the guard parallel with the axis of the head or, conversely, positioning the cutting edge of the blade parallel with the axis and inclining the friction edges as shown in Figs. 1 and 3.

The results will be the same in either case, the purpose being to increase the distance from one friction edge to the other friction edge, around the cutting edge of the blade, as the twine (not shown) is passed downward during the cutting operation.

This positioning of the parts, taken with the sharpened friction edges 5 provide the means for cutting the twine, the sharpened edges assisting to hold the twine taut against the cutting edge of the blade, thereby forcing the cutting edge to sever the twine as it is brought manually downward over the angularly disposed cutting and sharpened edges of the cutter.

To provide for a free ingress of the twine into the cutter a mouth 9 is provided at the upper extremity of the cutter by rounding the upper end of the guard in a direction away from the cutting blade, as at 10, and also rounding the upper end of the cutting blade, as at 11, in an opposite direction forming an entrance more or less of a V form.

The inner edges of the V are blunted as a further protective measure, and smoothing these parts with the before mentioned protective measures, provides a cutter that is absolutely safe to handle and to operate.

Figure 2:
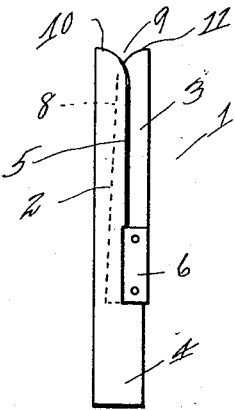
Fig. 2 is a front elevation thereof.

The tube of which the head is constructed, is preferably of split construction as shown at 12 in Fig. 2, and hence the sleeve 4 has a more or less yielding nature which is utilized in slidably attaching the guard to a supporting foot 13 for yielding and adjustable frictional engagement therewith.

An intermediate piece 14 may be provided if desired, and this piece may be utilized to provide a handle, as well as to adjust the cutter to a height convenient to large packages.

In use the cutter and its supporting foot are assembled and the device is then ready for operation.

For operation the device may be moved about to the most convenient place for the work, and may be secured to a bench, counter or side wall if desired, in any suitable manner (not shown) and in cutting the twine the parcel is tied and the long end of the twine is then manually brought downward into the mouth of the cutter, when the downward movement is continued until the twine is severed.

The usual procedure will be found to be to grasp the twine in both hands, close to the package, drawing the twine taut and inserting the taut part into the mouth.

The twine now contacts the friction and the cutting edges, the friction edges assisting the hands to maintain the twine in a straight and taut line against the cutting edge of the blade, the cutter severing the twine close to the package as it passes downward over the sharpened edge.

The word "twine" is here used to indicate any cutable material of the twine nature that may be inserted in the mouth of the cutter.

Having thus described my invention, I claim:

1. In a twine cutter, the combination of a cutting means consisting of a guard of general tubular form and shaped to provide a U-shaped cross section at its upper part and a yielding tubular split sleeve at its lower part, and having intermediately positioned wings, and having the parts corresponding to the legs of the U provided with friction edges on their inner sides, said friction edges being formed to provide a smooth outer surface, and a cutting blade removably attached to said wings and having a cutting edge positioned to be covered by said guard, and a support adapted to yieldingly receive and frictionally secure the yielding tubular portion of said guard.

2. In a twine cutter, the combination of a cutting means consisting of a guard of general tubular form and shaped to provide a U shaped cross section at its upper part, and a yielding tubular split sleeve at its lower part, and having intermediately positioned wings formed integral with the guard, and having the parts corresponding to the legs of the U provided with friction edges on their inner sides, said friction edges being formed to provide a smooth outer surface, and terminating in a blunt upper extremity, and a cutting blade removably attached to said wings and having a cutting edge positioned to be covered by said guard, and terminating in a blunt upper extremity, said upper extremities being positioned to form a mouth, and a support adapted to adjustably receive and frictionally secure the yielding tubular portion of said guard.

In testimony whereof I have affixed my signature.

WILLIAM O. CARLEY.